United States Patent Office 3,086,640
Patented Apr. 23, 1963

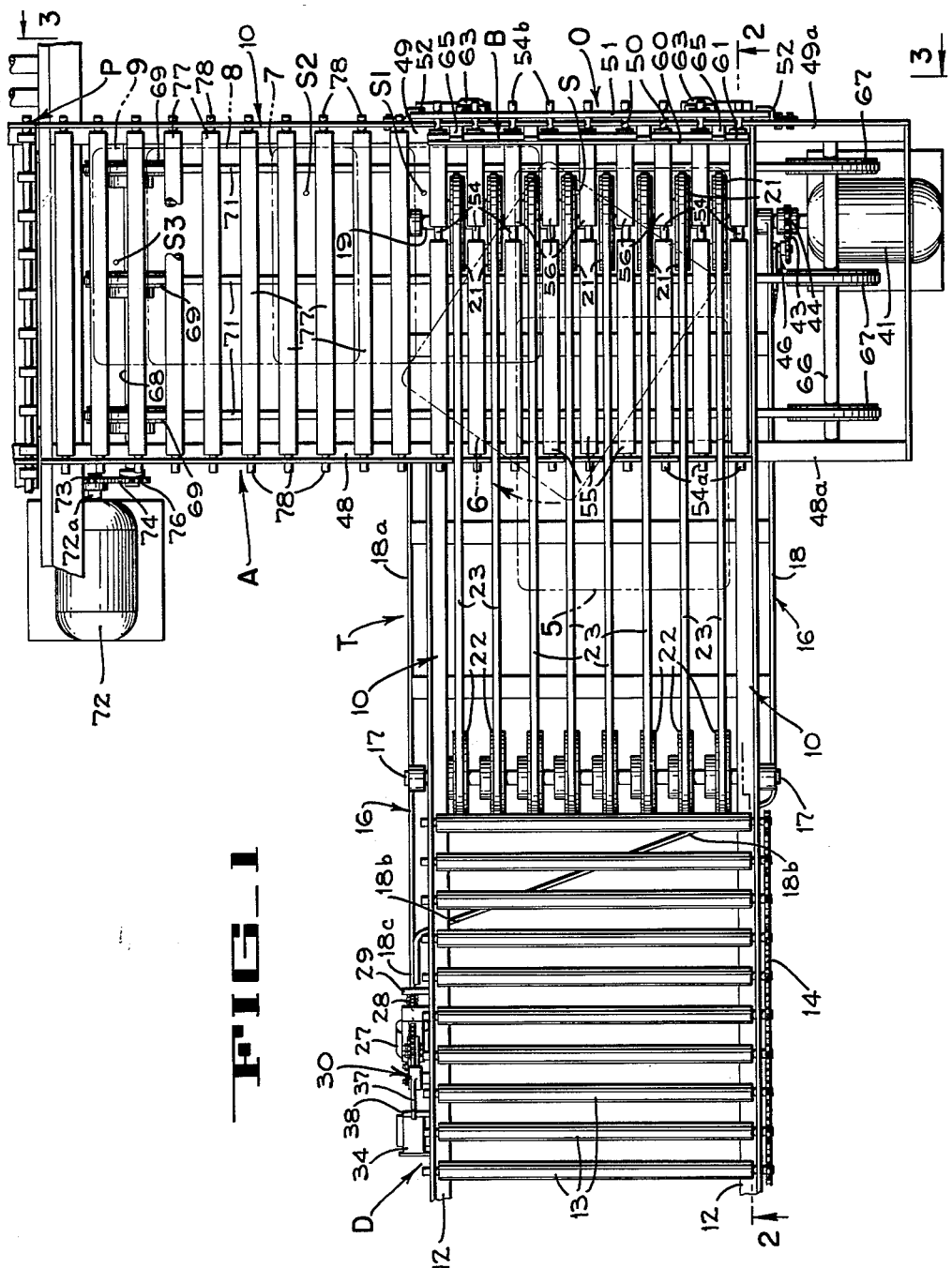

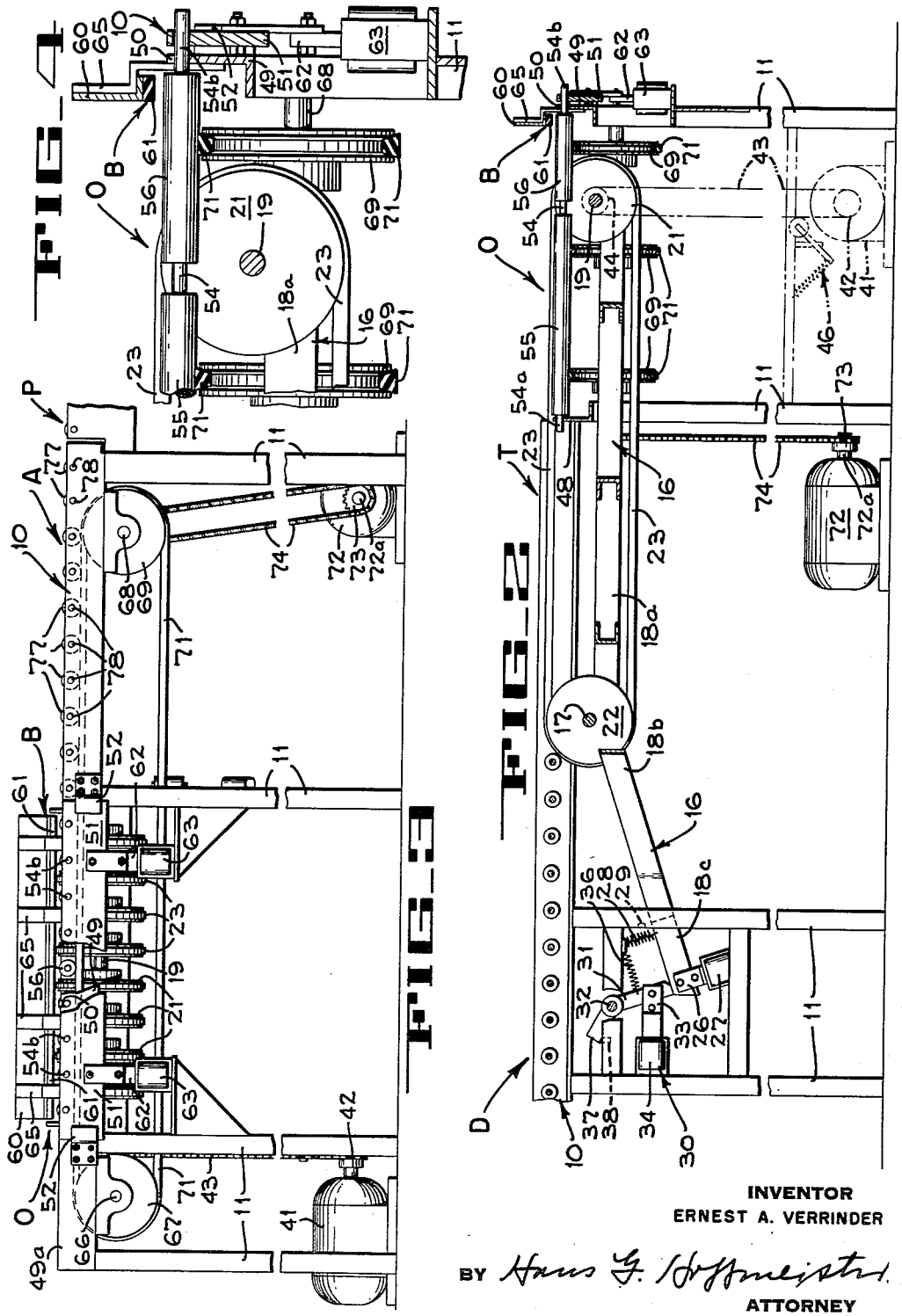

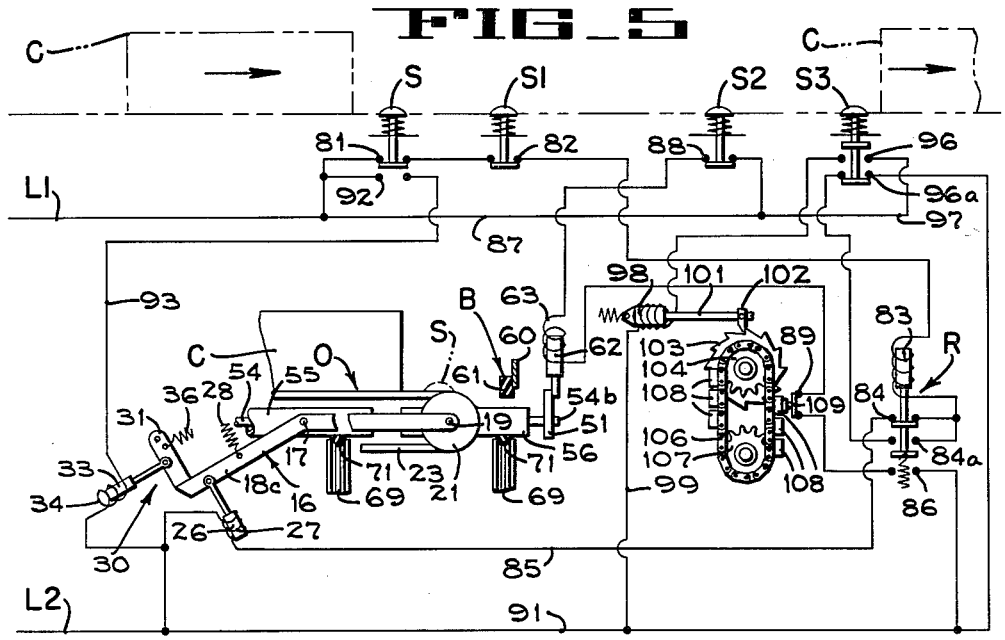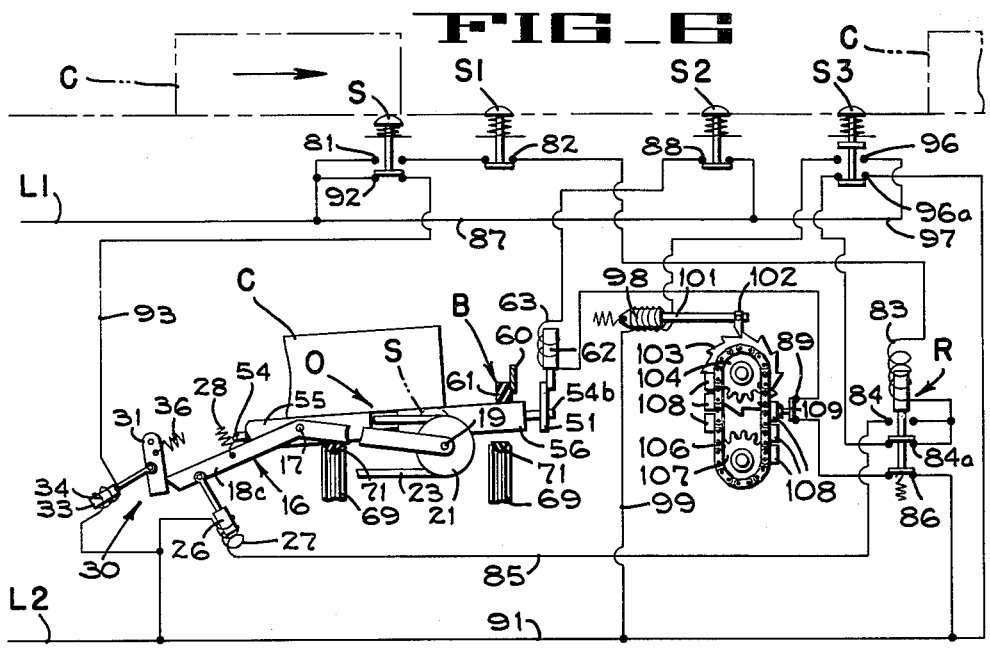

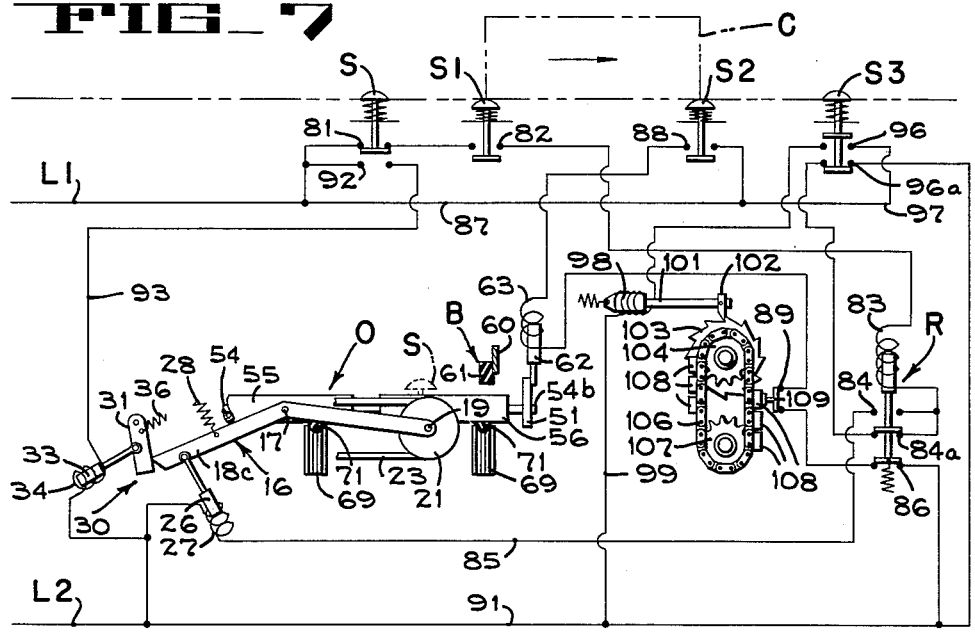
FIG_7
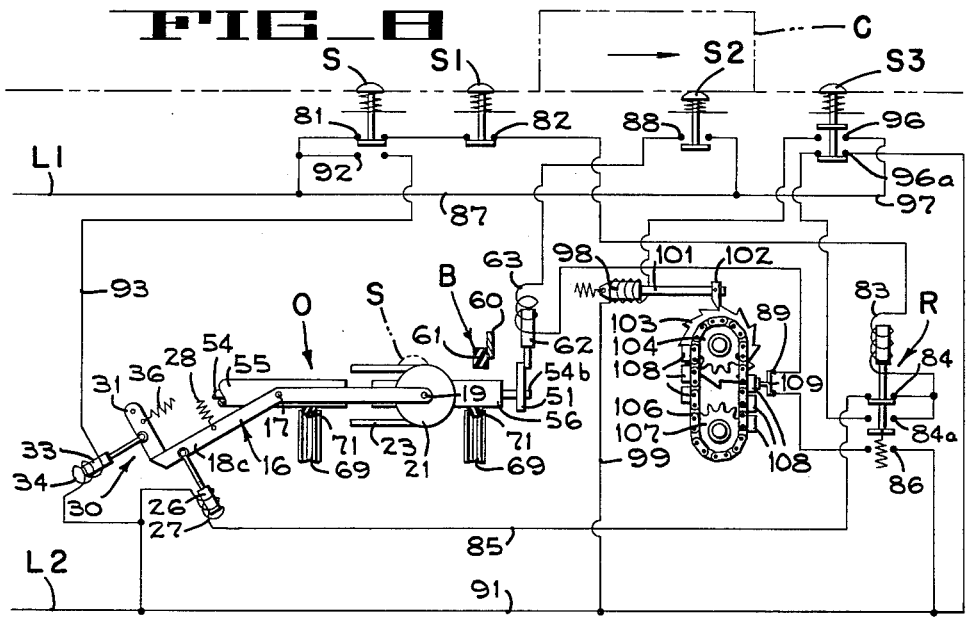
FIG_8
INVENTOR
ERNEST A. VERRINDER
BY Hans G. Hoffmeister
ATTORNEY

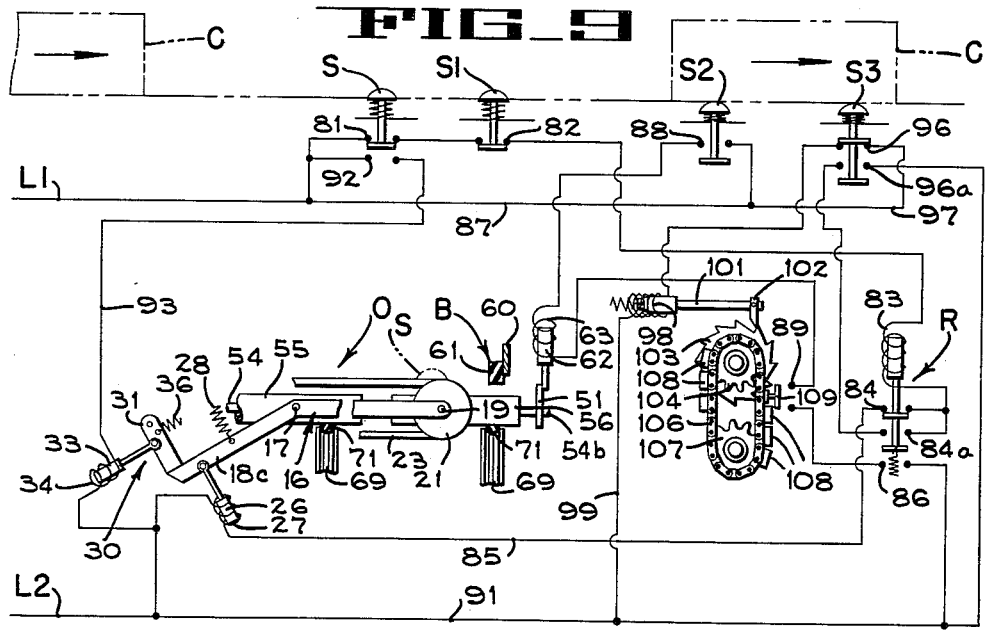
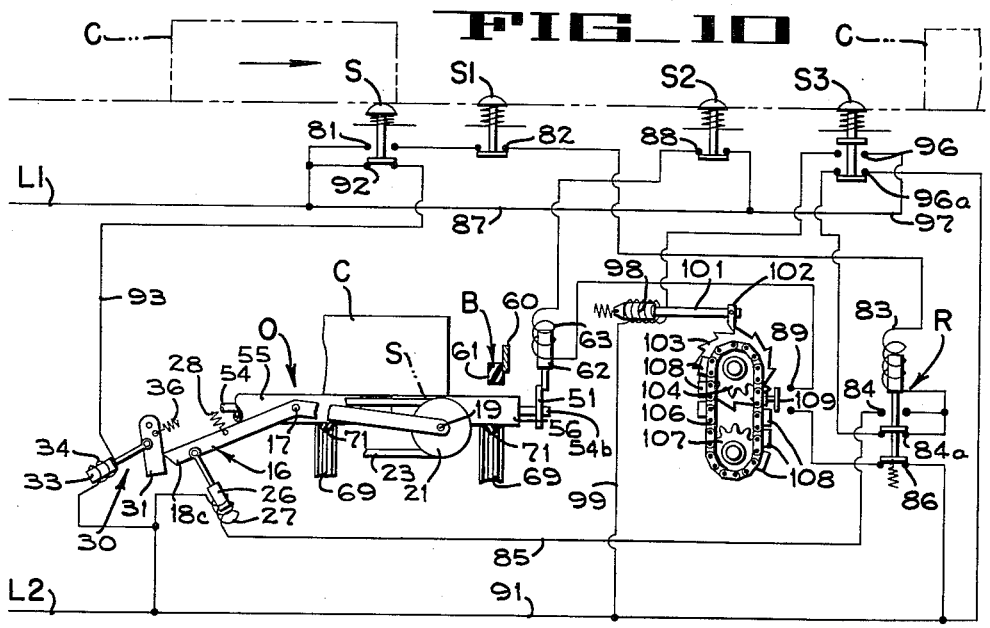

3,086,640
ARTICLE HANDLING APPARATUS
Ernest A. Verrinder, Riverside, Calif., assignor to FMC Corporation, a corporation of Delaware
Filed Dec. 22, 1960, Ser. No. 77,634
18 Claims. (Cl. 198—33)

This invention relates to article handling apparatus and more particularly to apparatus for orienting and conveying articles such as oblong cartons.

It is customary to load pallets with a number of articles having the same dimensions by stacking layers of the articles upon the pallets. If all of the articles are similarly oriented, vertical cleavage planes are established which render the stack of articles on the pallet unstable. It has been found that the stack of articles on the pallet can be rendered stable if the articles of different rows within a layer are differently oriented, or if all of the articles of successive layers are differently oriented, to provide some overlapping between layers.

When stacking oblong cartons for example, stability can be obtained if the layers are frictionally interlocked by turning the cartons in some rows, or in some layers, through an angle of 90° relative to other cartons, before they are delivered to the pallet loading apparatus. Apparatus for delivering articles to a pallet loader that does this is described in the patent to Stevenson No. 2,815,846, wherein an article turning pin is selectively positioned in the path of articles being delivered by a conveyor in order to turn the articles by a selected angle, usually 90°. The pin can be retracted whereupon the articles will enter the pallet loader directly, without being turned.

In accordance with this invention, articles are delivered and selectively oriented for the purpose outlined above by means that frictionally restrain an under portion of the articles to be turned, while moving another portion of the articles until the desired turning action is completed. The frictional restraint is then removed, whereupon the re-oriented article may advance directly to the pallet loader. The above-described turning operation of the invention has the advantage that there is no tendency for the article orienting mechanism to dent or otherwise damage the article being turned.

It has also been proposed to orient articles for the purposes described by interrupting their motion and lifting them with a turntable. Such devices impose limitations on the article handling speed. Accordingly, an object of the invention is to deliver and selectively orient articles that are moving at high speeds, including speeds that might damage cartons or similar articles if they were brought forcibly against a rigid turning or deflecting pin, or if their motion were suddenly interrupted by lifting and turning them with a turntable.

Briefly, the system to be described in detail presently includes an L-shaped frame having an article delivery conveyor in one leg, an article advancing conveyor in the other leg, and an article orienting mechanism at the intersection of the legs. The orienting mechanism includes a plurality of sets of axially aligned, but independently rotatable rollers. One roller in each set, to be termed a control roller, can be selectively raised from a driven, article advancing position to a braked, article restraining position. The other roller in each set, to be termed an article advancing, or advancing and turning roller is continuously driven. The control rollers, when braked, frictionally engage and restrain an under surface of the article, while the continuously driven advancing rollers advance and turn the article. After the article has been turned, the brake for the control rollers is released and the control rollers are driven. Now the article advances directly away from the orienting mechanism under the drive of both types of rollers, and is thereafter conveyed directly toward the pallet loader.

Another object of the invention is to provide means for transferring articles between two conveyors at right angles to each other. In the embodiment of the invention described, this is accomplished by a transfer conveyor section that includes a row of continuously driven transfer belts nested between the rollers of the orienting mechanism. The transfer belts are raised above the orienting rollers to carry articles along and over the rollers, and then the transfer belts ae lowered to deposit the articles directly on the orienting rollers. Whether or not the articles thus deposited are turned, depends upon whether or not the control rollers of the orienting mechanism are braked. If the rollers are braked, the articles will be turned, if not, they will be transferred directly and laterally to the advancing conveyor section, that carries them to the pallet loader. Braking of the control rollers is initiated by article sensing switch means electrically connected to various solenoids, a relay, and a timer or article counting device, such as that described in the aforesaid Patent No. 2,815,846 for controlling an article deflector pin.

Another object of the invention is that of providing driving means, for both the advancing and the control rollers of the orienting mechanism, that can operate continuously, even though the control rollers may be braked at times. In the embodiment of the invention to be described in detail, this is accomplished by two or more continuously moving drive belts disposed beneath the sets of advancing and control rollers. When the control rollers are to be braked, they are lifted clear of their drive belt and brought against a fixed brake shoe disposed above the rollers. The advancing rollers in each set of rollers remain in driving engagement with their driving belts and so continue to rotate and initiate the article turning action when the control rollers are braked. After the articles have been turned, the control rollers need only be dropped back against their drive belt, so that the articles are advanced directly onto the advancing conveyor section that conducts them to the pallet loader.

The foregoing and other objects of the invention will be better understood from the following description of an embodiment thereof with reference to the drawings, in which:

FIGURE 1 is a fragmentary plan of an apparatus embodying the invention.

FIGURE 2 is a vertical section taken on line 2—2 of FIGURE 1.

FIGURE 3 is a side elevation looking in the direction of arrows 3—3 of FIGURE 1.

FIGURE 4 is a fragmentary front elevation at a control roller and brake assembly.

FIGURES 5–10 are diagrams showing a control system of the apparatus, and illustrating various stages in a cycle of operation.

The embodiment of the article conveying and orienting apparatus of the present invention illustrated in FIGURE 1 is generally L-shaped and includes four major sections which are identified as a delivery conveyor section D, a transfer conveyor section T, an article orienting and control mechanism O, and an article advancing conveyor section A. The latter section is arranged to direct articles, such as cartons, to a pallet loading machine, a fragment of which is indicated at P. The pallet loading machine may be of the type described in the aforesaid Patent No. 2,815,846. During operation of the machine, cartons are loaded on the delivery conveyor section D and are thereupon carried to the transfer conveyor T which rapidly advances them to a position over the orienting section O. At the orienting section, the cartons C may be turned, as indicated in broken lines on FIGURE 1, and after the cartons are turned, they are advanced directly along the advancing conveyor section A, to the pallet loading apparatus P. No attempt has been made in FIGURE 1 to illustrate the mode of operation of the apparatus during a cycle wherein the orienting mechanism does not turn the cartons. During that type of operation, after the cartons are advanced over the orienting mechanism by the transfer belts of the transfer conveyor T, and deposited upon the rollers of the orienting mechanism, they are advanced directly to the advancing conveyor section A, as deposited.

Continuing the detailed description of the apparatus, the mechanism is mounted on a frame 10 that is generally L-shaped, as best seen in FIGURE 1. The frame is supported on a number of legs 11, which position the apparatus high enough to match the upper or loading portion of the pallet loader P.

The delivery section D of the apparatus is of conventional design and includes a pair of laterally spaced angle irons 12, which rotatably mount a series of rollers 13, that are connected and driven by a chain 14, and an electric motor, not shown. The inlet end of the delivery section D may be of any length and is arranged to extend to a suitable location at which the cartons are loaded on the apparatus.

The transfer conveyor mechanism T extends from the delivery conveyor section D, to and along the orienting mechanism O. The transfer conveyor includes a rigid pivoted frame member indicated generally at 16 (FIGURE 2). The rigid frame member is pivoted to the main frame 10 of the apparatus by means of a cross shaft 17, and as seen in FIGURE 1, the transfer frame member 16 includes opposed arm sections 18 and 18a made of flat bar stock and joined by a transverse diagonal section 18b. The free ends of arm sections 18 and 18a of the frame mount a pulley shaft 19 on which a row of vertically liftable pulleys 21 is keyed. A corresponding row of vertically stationary pulleys 22, is rotatably mounted on the pivot shaft 17. Transfer conveyor V-belts 23 extend around aligned pairs of pulleys 21 and 22. The pulley shaft 19, its pulleys 21, and the associated reaches of V-belts 23, can be alternately raised to provide for carrying cartons along and over the orienting mechanism O, and lowered for depositing the cartons on such mechanism.

In order to control the raising and lowering of the pulleys 21 and the V-belts 23, a tension spring 28 (FIGURE 2) and an armature 26 of a belt-lifting solenoid 27 are connected to the forward end 18c of the pivotal frame 16. The spring 28 is connected to the main frame 10 and exerts an upward pull on the frame end 18c causing the V-belts 23 to be lowered. A suitable stop 29 is fastened to the main frame 10 for limiting the amount by which the spring 28 can lower the V-belts. The solenoid 27 acts in opposition to spring 28. Accordingly, when the solenoid 27 is energized, the armature 26 and the frame end portion 18c move downward, causing the V-belts 23 to be raised.

In order to relieve the belt-lifting solenoid 27 of the load of the cartons and in order to positively maintain the belts in their raised position, a simple latching mechanism 30 is provided. This mechanism includes a latch dog 31 which is pivotally mounted on the frame by a pin 32. When the frame end portion 18c is lowered, the lower end of dog 31 engages the end portion 18c and therefore holds the belts 23 in their raised position. In order to retract latch dog 31, and thus release the end portion 18c so that the spring 28 can lower the belts, an armature 33 of a solenoid 34 is connected to the latch dog 31, which armature is controlled by the solenoid winding. A spring 36 is also connected to latch dog 31 and urges the latch towards its latching position. At its upper end, the latch dog has an ear 37 that engages a stop 38 on the frame when the dog is in the latching position. When the latch solenoid 34 is energized, the latch 31 is pulled clear of frame end portion 18c against the resistance of the spring 36, as indicated diagrammatically in FIGURE 6. When this occurs, the belt lowering spring 28, connected to the end portion 18c of the frame assembly 16, lowers the belts 23 to transfer cartons from the belts to the rollers of the orienting mechanism O.

The transfer conveyor belts 23 are continuously driven by means of a motor 41. A sprocket 42, which is keyed to the motor shaft, drives a chain 43 which in turn drives a sprocket 44. The sprocket 44 is attached to the pulley shaft 19 that mounts the row of vertically liftable pulleys 21. The actual distance by which the belts 23 may be raised and lowered, in order to be positioned above the rollers of the orienting assembly, or to be positioned below the upper surface of the rollers to deposit cartons on the rollers, is small. The effect of this motion on drive chain 43 is accommodated by a conventional spring-loaded belt tightener mechanism, indicated generally at 46.

The orienting mechanism O includes a plurality of shafts 54 each of which has one end 54a disposed in suitable apertures (not shown) in an angle bar 48, and has its other end 54b disposed in a notch 50 (FIGURES 3 and 4) formed in the upper surface of a second angle bar 49. Mounted for independent rotation on each shaft 54 is a set of two orienting rollers, namely a relatively long article turning and advancing roller 55, and a shorter, turn control roller 56. A roller lifting bar 51 (FIGURE 4), which is mounted alongside the angle bar 49, is apertured to receive the ends 54b of shafts 54. As will be explained presently, the lifting bar 51 is mounted for vertical movement to raise the short rollers 56 away from their driving belts and, in this vertical movement they are guided by plates 52 (FIGURE 3).

Disposed above the control rollers 56 is a brake assembly B (FIGURE 4) which includes a longitudinal plate 60 (FIGURE 3), attached to angle iron 49 by suitable brackets 65. An elongated rubber brake shoe 61 (FIGURE 4) is secured along the lower edge of the plate 60 for braking the control rollers 56 when they are raised into contact with the brake shoes. In order to lift bar 51, and thus brake the control rollers 56, two armatures 62 (FIGURE 3) are connected to the bar 51, and the armatures are lifted when controlled by solenoid windings 63. As indicated diagrammatically in FIGURE 6, when the solenoids 63 are energized, the bar 51 and the control rollers 56 are lifted, and the rollers are brought against the brake shoe 61.

In order to drive both the turning and advancing rollers 55 and the control rollers 56, a pulley shaft 66 (FIGURE 1) is mounted in end portions 48a and 49a of the angle irons 48 and 49 and carries a row of V-belt pulleys 67. At the discharge end of article advancing conveyor section A, another pulley shaft 68 is mounted in the same angle irons, and is drivingly connected to a second row of pulleys 69. V-belts 71 are trained around pulleys 67 and 69, there being three such V-belts, two for engaging the underside of the advancing rollers 55 in driving relation, and one for driving the control rollers 56. As seen in FIGURE 3, in order to drive the V-belts 71, a motor 72 is provided having a shaft 72a. A chain 74 is disposed around a sprocket 73, that is keyed to the motor shaft 72a, and around a sprocket 76, mounted on the drive shaft 68 which carries pulleys 69. The motor 72 runs continuously during operation of the device.

It will be noted that, when the transfer V-belts 23 are in their raised position, as shown in FIGURE 2 and in the diagram of FIGURE 5, these belts are at an elevation greater than both the article advancing rollers 55 and the control rollers 56. Accordingly, cartons can be carried over and along the rollers 55, 56 by the transfer belts 23. Likewise, as indicated diagrammatically in FIGURE 7, when the V-belts 23 are lowered by releasing the latch 31, the portions of the transfer belts disposed along the orienting mechanism move to a position below the rollers 55, 56 so that cartons are thereby transferred from the V-belts 23 to the rollers 55, 56. The article orienting action that thereafter occurs depends upon whether or not brake solenoids 63 are energized to lift rollers 56 against the brake shoe 61 which forms part of the brake assembly B.

When brake actuating solenoids 63 are energized to lift control rollers 56 against the brake shoe, these rollers are simultaneously lifted clear of their driving belt 71, as indicated diagrammatically in FIGURE 6. However, the actual amount of lifting movement required to brake control rollers 56 is relatively small, and is not enough to lift the advancing rollers 55 from their driving engagement with their associated driving V-belts 71. In other words, the V-belts 71 will always be deflected somewhat by their engagement with rollers 55 and thus will maintain contact therewith, even though the outer ends 54b of the roller shafts 54 be lifted slightly to brake control rollers 56.

As seen in FIGURES 1 and 3, the same V-belts 71 that drive the rollers of the orienting mechanism also drive rollers 77 of the article advancing conveyor section A. Rollers 77 rotate on shafts 78 mounted in the spaced angle irons 48, 49. As previously mentioned, the advancing conveyor section A carries cartons, that may or may not have been turned by the orienting mechanism O, to the pallet loader unit P, only a fragment of the latter appearing in the drawings.

A cycle in the operation of the apparatus will now be described in conjunction with the diagrams of FIGURES 5–10. Certain additional control elements, not heretofore described in detail, will be introduced and described along with the description of the operation of the device. This descripiton can also be better understood with reference to FIGURE 1, wherein a carton is shown in broken lines in six positions before, during and after a turning operation. Five of these positions are numbered 5–9 to key them to FIGURES 5–9.

As seen in FIGURE 1, four switches S, S1, S2 and S3 are provided to automatically control the operation of the device. These switches have actuators which project upwardly between various rollers 56 and 77 so that they are depressed when the cartons are advanced through the apparatus. These switches include a transfer belt-lowering and brake-applying switch S, disposed in the orienting mechanism; a switch S1 for maintaining the transfer belts in their lowered position, disposed just at the exit of the orienting mechanism; a switch S2 for releasing the brake for the control rollers, disposed near the entrance of the carton advancing conveyor section A; and a switch S3 for indexing the counter or timer, disposed toward the exit end of the carton advancing conveyor section A. These switches are also indicated diagrammatically in FIGURES 5–10. In practice, the relative positions of the switches is determined by the dimensions and size of the apparatus and the cartons to be handled. Accordingly, the positions shown in FIGURES 1 and 5–10 indicate only the general arrangement of the switch and these positions have been chosen only for the purpose of illustrating the mode of operation of the control system. In the diagrams, the four switches S, S1, S2 and S3 are arranged in a row across the top of the figures, and cartons that operate them are indicated in broken lines. However, to avoid confusion switch S is also shown in broken lines below, in the portion of the diagram showing the orienting mechanism, and where a carton would appear at this part of the diagram, it is shown in full lines.

In the diagram of FIGURE 5, a carton C is shown approaching the orienting mechanism, and a previously oriented carton is shown on the advancing conveyor section A. Electric current is supplied to the control system by the lines L1 and L2. The approaching carton has not reached switch S, so that its normally closed contacts 81 are closed, as are normally closed contacts 82 of switch S1. These closed contacts connect line L1 to a coil 83 of a relay R and closes upper relay contacts 84. When contacts 84 are closed, a line 85 energizes belt-raising solenoid 27, thereby raising the transfer belts 23, which are automatically latched in their raised position. The circuit connections of FIGURE 5 continue during the approach of a new carton C.

In FIGURE 6, the carton C has been transferred along and over the orienting mechanism O, a sufficient distance to depress the belt lowering switch S. This opens switch contacts 81 and relay R drops out, opening contacts 84, and de-energizing the belt-raising solenoid 27. Simultaneously lower relay contacts 86 are made, and a circuit is completed from a branch 87 of line L1, through normally closed contacts 88 of the brake release switch S2, and to the brake applying solenoid 63, through a set of counter or timer contacts 89, lower relay contacts 86, and back to line L2 by means of a branch line 91. The control rollers 56 are now lifted and braked by the brake mechanism B.

Also, when switch S is depressed by the carton, a set of lower, normally open contacts 92 are closed to connect line L1 to a conductor 93, the latch solenoid 34 and back to line L2. Energization of the latch solenoid pulls the latch 31 clear of the end portion 18c of the belt mechanism, thereby permitting spring 28 to lower the transfer belts, and deposit the carton on the article turning and advancing rollers 55, and on the control rollers 56. As indicated in FIGURE 6, turning of the carton now begins, because the under portion thereof is partially restrained by the braked control rollers 56, while the remainder of the under portion is driven by the advancing and turning rollers 55. It will be noted that the control rollers 56 are lifted clear of their drive belt 71. The rollers 77 of the advancing conveyor section A, assist in the turning operation.

In FIGURE 7, the carton has been fully turned, as is indicated by position 7 in FIGURE 1, and the carton is ready to be advanced along the advancing conveyor section A. The carton has now swung over far enough to depress the brake release switch S2, but it still depresses the belt lowering switch S1, so that the belt lowering solenoid 27 remains de-energized, and the transfer belts 23 remain in their lowered position. However, when the carton depresses the brake release switch S2, contacts 88 of switch S2 are opened, thereby de-energizing the brake solenoid 63, so that the rollers 56 drop back against their drive belt 71 and start to turn. The carton is now advanced directly by both the orienting mechanism O and the advancing conveyor A.

In FIG. 8, the carton has advanced to clear the belt lowering switch S1, and its contacts 82 are now closed, as are the contacts 81 of the switch S, completing the circuit to the solenoid 83 of relay R from line L1. Relay R includes a set of re-set contacts 84a, that can complete the circuit from its solenoid 83 to line L2 through a lower set of normally closed contacts 96a, on indexing switch S3. At the time the carton cleared switch S1, the contacts of relay R were down, and contacts 84a were closed. This momentarily re-energized the solenoid 83 of relay R, and closed upper, holding contacts 84. The closing of contacts 84 also energized the belt lifting solenoid 27, and lifted the transfer belts 23 to clear the rollers between which they nest. The transfer belts are now ready to transfer another carton onto the orienting mechanism when it appears.

In FIGURE 9, the carton has advanced far enough to depress the indexing switch S3. This closes normally open contacts 96 of that switch, and a branch 97 of line L1 energizes the indexing solenoid 98, through a branch 99, connected to branch 91 of line L2. The indexing solenoid advances a solenoid armature 101, and a pawl 102 mounted on the end of the armature, turns a ratchet wheel 103 a distance of one tooth. This turns a sprocket wheel 104, connected to the ratchet wheel 103, and moves a chain 106, which is also meshed with an idle sprocket 107. Three removable contactor blocks 108 are shown mounted on chain 106, for engaging a contactor 109. Before the action taking place in FIGURE 9 occurred, contacts 109 were closed, but now, as seen in FIGURE 9, the last contact block 108 rides clear of the contactor 109, and contacts 89 open. This opens the circuit to the brake solenoid 63, regardless of the position of belt lowering and brake applying switch S, and the relay R.

As seen in FIGURE 10, when the next carton depresses the belt lowering and brake applying switch S, although the relay solenoid 83 is de-energized and contacts 86 closed, the brake applying solenoid 63 is not energized by relay R, the circuit being interrupted at the timer. However, lower contacts 92 of switch S are again closed, and latch solenoid 34 is again energized to retract latch 31 and permit the spring 28 to lower the transfer belts 23. As soon as the belts are lowered, the carton is advanced directly by both the control rollers 56 and the advancing rollers 54, so that the carton is not turned but advances laterally and directly onto the advance conveyor section A. This direct transfer of cartons without turning them (except for the change in direction that results inherently because of the L-shaped construction of the device) continues, until the first of a set of contact blocks 108 on the timer chain is brought under the contactor 109, be repeated depression of the indexing switch S3, as the cartons pass over that switch. So long as the timer interrupts the circuit through the brake solenoid, the transfer belt lowering and raising portions of the circuit operates alone, to alternately bring cartons along the orienting mechanism rollers and deposit them on the rollers, while all rollers are turning.

Thus it can be seen that the cartons are turned, in accordance with the timer, without need for interposing any rigid deflecting pins or similar means in the path of the cartons. Those cartons that are turned, are turned by frictional engagement with the under sides thereof, and therefore can be oriented at relatively high speed without danger of damaging the cartons, even though they be quite fragile.

The optimum or exact positions of the various switches S, S1, S2 and S3, controlled or depressed by the cartons, can best be determined in actual practice, and will depend upon the size of the cartons, the speed of operation, and other factors readily evaluated in service.

While one embodiment of the present invention has been shown and described, it will be understood that various changes and modifications may be made without departing from the spirit of the invention or the scope of the appended claims.

The invention having thus been described, what is claimed to be new and desired to be protected by Letters Patent is:

1. Article conveying and orienting apparatus comprising a plurality of parallel shafts; sets of independently rotatable rollers on each shaft, each set comprising an article control roller and an article advancing roller, means for driving said article advancing rollers in one direction, continuously moving friction drive means for said control rollers, means for lifting said control rollers out of engagement with said friction drive means, and means for braking said lifted control rollers for frictionally restraining a portion of an article resting thereon to cause said article advancing rollers to turn the article.

2. Article orienting and advancing apparatus comprising a row of sets of axially aligned independently rotatable rollers, each set comprising an article control roller and an article advancing roller, a continuously moving drive belt for the rollers in each set disposed beneath and in engagement with the rollers, conveyor belts extending between said rollers for advancing articles along and above the rollers, means for lowering said conveyor belts to bring the article against said sets of rollers, means for lifting a control roller in each set from its drive belt, means for breaking the lifted rollers for frictionally restraining a portion of an article resting thereon, the rotating advancing rollers in each set being effective to turn the article while it is frictionally restrained by said control rollers, and means for releasing said braked control rollers to bring them against their drive belt for causing the entire article to be thereafter advanced directly by both rollers in each set.

3. Article orienting and advancing apparatus comprising a row of sets of axially aligned independently rotatable rollers, each set comprising an article control roller and an article advancing roller, a continuously moving drive belt in driving engagement with the rollers in each set, conveyor belts extending between said rollers for advancing articles to a position above the rollers, means for lowering said conveyor belts to bring the article against said sets of rollers, means for lifting a control roller in each set from its drive belt, means for braking the lifted rollers for frictionally restraining a portion of an article resting thereon, the advancing rollers in each set being arranged to turn the article while it is frictionally restrained by said control rollers, and means for releasing said braked control rollers to bring them against their drive belts for causing the entire article to be thereafter advanced directly by both rollers in each set.

4. Article orienting and advancing apparatus comprising a row of sets of independently rotatable rollers, each set comprising an article control roller and an article advancing roller, conveyor belts extending between said rollers for advancing articles to a position above said rollers, means for lowering said conveyor belts to bring the article against said sets of rollers, means for braking the control roller in each set for frictionally restraining the portion of an article resting thereon, means for driving the article advancing roller in each set for turning the article while it is frictionally restrained by said control rollers, and means for releasing said braked control rollers for rotation to cause the entire article to be advanced directly by both rollers in each set.

5. Article orienting and conveying apparatus comprising an article delivery conveyor, an article orienting assembly, means for transferring articles from said delivery conveyor to said orienting assembly, and conveyor means for advancing oriented articles from said article orienting assembly to a loading station; said article orienting assembly comprising control means for frictionally engaging one portion of the under surface of an article disposed on said orienting assembly to restrain the article against direct motion in the direction of said advancing conveyor, means for drivingly engaged another portion of the under surface of the article for turning it in the direction of motion of said advancing conveyor while the article is frictionally restrained by said control means, and means for thereafter releasing said control means from restraining engagement with said article to accommodate direct advancing movement of the entire article toward said article advancing conveyor.

6. Article orienting and conveying apparatus comprising a generally L-shaped horizontal frame, an article delivery conveyor at one leg of said L-shaped frame, an article advancing conveyor at the other leg, and an article orienting assembly at the intersection of said legs, means for transferring articles from said delivery conveyor to said orienting assembly; said article orienting assembly comprising control means for frictionally engaging one portion of the under surface of article disposed on said orienting assembly to restrain the article against direct motion in the direction of said article advancing conveyor, article turning and advancing means for drivingly engaging another portion of the under surface of the article for turning it in the direction of motion of said article advancing conveyor while the article is frictionally restrained by said control means, and means for thereafter releasing said control means from restraining engagement with said article to accommodate direct advancing movement of the entire article toward said article advancing conveyor.

7. Article orienting and conveying apparatus comprising an article delivery conveyor, an article orienting assembly, means for transferring articles from said delivery conveyor to said orienting assembly, and conveyor means for advancing oriented articles from said article orienting assembly to a loading station; said article orienting assembly comprising control means for frictionally engaging an under portion of an article disposed on said orienting assembly to restrain the article against direct motion in the direction of said article advancing conveyor, article turning and advancing means for drivingly engaging another under portion of the article for turning it in the direction of motion of said article advancing conveyor while the article is frictionally restrained by said control means, means for thereafter releasing said control means from restraining engagement with said article to accommodate direct advancing movement of the entire article toward said advancing conveyor by said article turning and advancing means, and timer means actuated by articles on said article advancing means for maintaining said control means in its released condition for direct advance of a selected number of articles by said orienting assembly.

8. Article orienting and conveying apparatus comprising an article delivery conveyor, an article orienting assembly, means for transferring articles from said delivery conveyor to said orienting assembly, and conveyor means for advancing oriented articles from said article orienting assembly to a loading station; said article orienting assembly comprising rotatably mounted article control means for engaging one portion of the under surface of an article disposed on said orienting assembly, article turning and advancing means for drivingly engaging another portion of the under surface of the article for turning it in the direction of motion of said article advancing conveyor while the article is frictionally restrained by said control means, brake means for resisting rotation of said control means to frictionally restrain said one portion of the article against direct motion in the direction of said article advancing conveyor, and means for thereafter releasing said brake means to accommodate rotation of said control means for direct advancing movement of the entire article toward said article advancing conveyor.

9. Article orienting and conveying apparatus comprising an article delivery conveyor, an article orienting assembly, a retractable transfer conveyor for transferring articles from said delivery conveyor to said orienting assembly, means for retracting said transfer conveyor to deposit the articles directly on said orienting assembly, and conveyor means for advancing oriented articles from said article orienting assembly to a loading station; said article orienting assembly comprising control means for frictionally engaging one portion of the under surface of an article disposed on said orienting assembly to restrain the article against direct movement in the direction of said article advancing conveyor, combined article turning and advancing means for drivingly engaging another portion of the under surface of the article for turning it in the direction of motion of said article advancing conveyor while the article is frictionally restrained by said control means, and means for thereafter releasing said control means from restraining engagement with said article to accommodate direct advancing movement of the entire article toward said article advancing conveyor.

10. Article orienting and conveying apparatus comprising an article delivery conveyor, an article orienting assembly, a retractable transfer conveyor for transferring articles from said delivery conveyor to said orienting assembly, means for retracting said transfer conveyor to deposit the articles directly on said orienting assembly, and conveyor means for advancing oriented articles from said article orienting assembly to a loading station; said article orienting assembly comprising rotatably mounted control means for frictionally engaging an under portion of an article disposed on said orienting assembly, combined article turning and advancing means for drivingly engaging another under portion of the article for turning it in the direction of motion of said article advancing conveyor while the article is frictionally restrained by said control means, brake means for resisting rotation of said control means to frictionally restrain said one portion of the articles against direct movement in the direction of said article advancing conveyor, and means for thereafter releasing said brake means to accommodate rotation of said control means for direct advancing movement of the entire article toward said article advancing conveyor.

11. Article orienting and conveying apparatus comprising an article delivery conveyor, an article orienting assembly, a transfer conveyor for transferring articles from said delivery conveyor to said orienting assembly, and conveyor means for advancing oriented articles from said article orienting assembly to a loading station; said article orienting assembly comprising control rollers, means for braking said control rollers to restrain an article resting thereon against direct motion in the direction of said article advancing conveyor, combined article turning and advancing rollers for drivingly engaging another portion of the under surface of an article resting thereon for turning the article in the direction of movement of said article advancing conveyor while the article is frictionally restrained by said control rollers, means for continuously driving said advancing rollers, and means for thereafter releasing the brake means for said control rollers to accommodate direct advancing movement of the entire article toward said article advancing conveyor; said transfer conveyor comprising a plurality of conveyor belts extending between said control rollers, means for raising said belts to move articles along and over said control rollers, and means for lowering said belts to deposit articles on said control rollers.

12. Article orienting and conveying apparatus comprising an article delivery conveyor, an article orienting assembly, a transfer conveyor for transferring articles from said delivery conveyor to said orienting assembly, means for retracting said transfer conveyor to deposit the articles directly on said orienting assembly, and conveyor means for advancing oriented articles from said article orienting assembly to a loading station; said article orienting assembly comprising rotatably mounted control rollers for frictionally engaging an under portion of an article disposed on said orienting assembly, combined article turning and advancing rollers for drivingly engaging another under portion of the article for turning it in the direction of movement of said article advancing conveyor while the article is frictionally restrained by said control rollers, means for continuously driving said advancing rollers, brake means for resisting rotation of said control rollers to frictionally restrain said one portion of the article against direct movement in the direction of said article advancing conveyor, and means for thereafter releasing said brake means to accommodate rotation of said control rollers to effect direct advancing movement of the entire article toward said article advancing conveyor; said transfer conveyor comprising a plurality of conveyor belts extending between said rollers, means for raising said belts to transfer articles along and over said rollers, and means for lowering said belts to deposit articles on said rollers.

13. Article orienting and conveying apparatus comprising an article delivery conveyor, an article orienting assembly, means for transferring articles from said delivery conveyor to said orienting assembly, and conveyor means for advancing oriented articles from said article orienting assembly to a loading station; said article orienting assembly comprising rotatably mounted article control rollers for engaging one portion of the under surface of an article disposed on said orienting assembly, combined article turning and advancing rollers for drivingly engaging another portion of the under surface of the article for turning it in the direction of motion of said article advancing conveyor while the article is frictionally restrained by said control rollers, drive belts beneath said rollers and extending across their axes for driving the rollers, brake means for resisting rotation of said control rollers to frictionally restrain said one portion of the article against direct motion in the direction of said article advancing conveyor, means for thereafter releasing said brake means to accommodate rotation of said control rollers, and means for bringing said control rollers into contact with the associated drive belt for initiating direct advancing movement of the entire article toward said article advancing conveyor.

14. Article orienting and conveying apparatus comprising an article delivery conveyor, an article orienting assembly, a transfer conveyor for transferring articles from said delivery conveyor to said orienting assembly, and conveyor means for advancing oriented articles from said article orienting assembly to a loading station; said article orienting assembly comprising article advancing rollers and article control rollers, belts beneath said advancing and control rollers for driving said rollers, means for lifting said control rollers clear of their drive belt, means for braking said lifted control rollers to restrain an article resting thereon against direct movement in the direction of said article advancing conveyor, said article turning and advancing rollers being arranged to simultaneously drivingly engage another portion of the under surface of an article resting thereon for turning the article in the direction of motion of said article advancing conveyor while the article is frictionally restrained by said control rollers, and means for thereafter releasing the brake means for said control rollers to accommodate direct advancing movement of the entire article toward said article advancing conveyor; said transfer conveyor comprising a plurality of conveyor belts extending between said rollers, means for raising said belts to transfer articles along and over said rollers, and means for lowering said belts to deposit articles on said rollers.

15. Article orienting and conveying apparatus comprising a generally L-shaped horizontal frame, an article delivery conveyor at one leg of said L-shaped frame, an article advancing conveyor at the other leg, and an article orienting assembly disposed for advancing articles in the direction of the extent of said other leg, means for transferring articles from said article delivery conveyor to said article orienting assembly; said article orienting assembly comprising control means for frictionally engaging one portion of the under surface of an article disposed on said orienting assembly to restrain the article against direct motion in the direction of said article advancing conveyor, article turning and advancing means for drivingly engaging another portion of the under surface of the article for turning it in the direction of motion of said article advancing conveyor while the article is frictionally restrained by said control means, and means for thereafter releasing said control means from restraining engagement with said article to accommodate direct advancing movement of the entire article toward said article advancing conveyor.

16. Article orienting and conveying apparatus comprising an article delivery conveyor, an article orienting assembly, a transfer conveyor including narrow, retractable belts for transferring articles from said delivery conveyor to said article orienting assembly, and conveyor means for advancing oriented articles from said article orienting assembly to a loading station; said article orienting assembly comprising control means for frictionally engaging one portion of the under surface of an article disposed on said orienting assembly to restrain the article against direct movement in the direction of said article advancing conveyor, combined article turning and advancing means for drivingly engaging another portion of the under surface of the article for turning it in the direction of motion of said article advancing conveyor while the article is frictionally restrained by said control means, and means for thereafter releasing said control means from restraining engagement with said article to accommodate direct advancing movement of the entire article toward said article advancing conveyor.

17. Article orienting and conveying apparatus comprising a generally L-shaped horizontal frame, an article delivery conveyor at one leg of said frame, an article advancing conveyor at the other leg, an article orienting assembly for advancing articles in the direction of the extent of said other leg, and a transfer conveyor for transferring articles from said delivery conveyor to said orienting assembly; said article orienting assembly comprising article advancing rollers and article control rollers, belts beneath said advancing and control rollers for driving said rollers, means for lifting said control rollers clear of their drive belt, means for braking said lifted control rollers to restrain an article resting thereon against direct movement in the direction of said article advancing conveyor, said article turning and advancing rollers being arranged to simultaneously drivingly engage another portion of the under surface of an article resting thereon for turning the article in the direction of motion of said article advancing conveyor while the article is frictionally restrained by said control rollers, and means for thereafter releasing the brake means for said control rollers to accommodate direct advancing movement of the entire article toward said article advancing conveyor; said transfer conveyor comprising a plurality of conveyor belts extending in the direction of said article delivery conveyor and parallel to the rollers of said article orienting assembly, means for raising said belts to transfer articles from said delivery conveyor into alignment with said article orienting assembly, and means for lowering said belts to deposit articles on rollers of said apparatus that are disposed to advance articles in the direction of the extent of said other leg of the L-shaped frame.

18. Article orienting and conveying apparatus comprising an article delivery conveyor, an article orienting assembly, means for transferring articles from said delivery conveyor to said orienting assembly, and conveyor means for advancing oriented articles from said article orienting assembly to a loading station; said article orienting assembly comprising rotatably mounted article control means for engaging one portion of the under surface of an article disposed on said orienting assembly, article turning and advancing means for drivingly engaging another portion of the under surface of the article for turning it in the direction of motion of said article advancing conveyor while the article is frictionally restrained by said control means, brake means for resisting rotation of said control means to frictionally restrain said one portion of the article against direct motion in the direction of said article advancing conveyor, and means for operatively engaging said brake means and said control means at a predetermined interval as the article is advanced to cause turning of the article.

References Cited in the file of this patent

UNITED STATES PATENTS

| | | |
|---|---|---|
| 1,321,303 | Haldeman | Nov. 11, 1919 |
| 2,947,405 | Fenton | Aug. 2, 1960 |